United States Patent Office 3,457,037
Patented July 22, 1969

3,457,037
METHOD FOR PRODUCING TITANIUM DIOXIDE CONCENTRATE FROM MASSIVE ILMENITE ORES
Mauro M. Aramendia, South Amboy, and David L. Armant, New Shrewsbury, N.J., assignors to National Lead Company, New York, N.Y., a corporation of New Jersey
No Drawing. Filed Aug. 15, 1967, Ser. No. 660,587
Int. Cl. C01g 23/04; C22b 1/00
U.S. Cl. 23—202          4 Claims

ABSTRACT OF THE DISCLOSURE

The present invention relates in general to $TiO_2$ concentrates prepared by upgrading titaniferous iron ores and more especially to a relatively low cost, practical process for upgrading massive ilmenite ores of the MacIntyre type to produce a chlorination feed material.

As used herein the term chlorination feed material has reference to $TiO_2$ concentrates used in the production of $TiCl_4$, a typical $TiO_2$ concentrate being one comprising at least about 95% by weight of $TiO_2$, and no more than about 1.5% iron and other chlorinatable materials.

BACKGROUND OF THE INVENTION

Prior to the instant invention the principal commercial source of chlorinator feed materials have been natural rutile ores. These natural rutile ores, when upgraded by the removal of gangue material provide concentrates having exceptionally high amounts of $TiO_2$, i.e., as high as 98% and very small amounts of other metallic and nonmetallic chlorinatables and hence are ideal feed materials for the production of titanium tetrachloride. Unfortunately however, the sources of natural rutile ore are almost exclusively Quilon ore from India and Australian and Florida beach sands which are not only relatively expensive but are being rapidly depleted.

While there are numerous disclosures in the literature of methods for upgrading ilmenite and other titaniferous ores to produce $TiO_2$ concentrates, to our knowledge none of these techniques has ever been sufficiently practical or economical for adoption on a commercial scale. The so-called solid-state reduction process uses coke or coal as a reductant and among other deterrents the temperatures required are, with few exceptions, extremely high, i.e., at least 1100° C. and as a consequence during reduction the $TiO_2$-bearing phase becomes iron and/or magnesium dititanate from which the iron is not easily reducible; and the dititanate phase, being mobile at these high temperatures consolidates to greatly decrease the porosity of the reduced concentrate. When examined with a metallograph at 1000× magnification these reduced concentrates appear relatively dense. Moreover, the metallic iron is in the form of relatively large particles of from 1 to 10 microns, or larger, some of which are solidly embedded in the dititanate phase. Hence even after leaching these reduced concentrates with mineral acids for prolonged periods of time, the amount of unreduced iron and/or residual metallic iron in the concentrate is relatively high which has discouraged their use commercially as a chlorination feed material.

It is also known that $TiO_2$ concentrates in the form of slages have been produced by first reducing an ilmenite ore concentrate with a gaseous reductant i.e., hydrogen, after which the reduced concentrate is melted in an electric arc furnace to produce molten iron and a $TiO_2$ rich slag. At best, such processes are complicated and costly and the slags produced are not equivalent to $TiO_2$ concentrates derived from natural rutile ores.

More recently a novel process has been discovered for producing low cost chlorination feed materials from weathered ilmenites using hydrogen as a reductant followed by leaching the metallized ore with sulfuric acid. This invention is described in assignee's copending application Ser. No. 588,328, filed Oct. 21, 1966; and while chlorination feed material of as high as 98.1% $TiO_2$ and as little as 1.3% residual iron have been made by this novel process the so-called massive ilmenites, typical of which is MacIntyre ore from the MacIntyre mines at Tahawus, N.Y., do not yield satisfactory chlorination feed materials by this process. This has been attributed to factors which characterize the massive type ilmenite ores, namely, extremely low ratios of ferric to ferrous iron and high amounts of chlorinatable constituents, i.e., MgO, an analysis of a typical MacIntyre ore being:

|  | Raw ore | Upgraded ore [1] |
|---|---|---|
| $TiO_2$, percent | 45.4 | 50.6 |
| Fe (t) | 33.6 | 36.4 |
| $Fe^{+3}/Fe^{+2}$ | 0.09:1 | 0.09:1 |
| MgO | 2.9 | 2.6 |

[1] Upgraded-gangue removed by magnetic and/or high tension separators.

Previous efforts to make a chlorinatable feed material from these massive types of ilmenite using the solid-state and hydrogen reduction techniques of the prior art followed by leaching to remove the iron values have consistantly produced concentrates having relatively high levels of iron and magnesium. Both the iron and magnesium values are chlorinatable materials and consume large amounts of chlorine during chlorination of the titanium values in the concentrate. Moreover, magnesium chloride at normal chlorination temperatures, is a sticky substance which rapidly plugs up the bed of the chlorinator and its connecting pipelines. Efforts to remove the magnesium fraction from these concentrates by leaching with a strong mineral acid have not been feasible, economically, due to the loss of relatively high amounts of $TiO_2$ by dissolution, reduction in size of concentrate with attendant dust losses, and cost of reconcentrating the acid.

SUMMARY OF THE INVENTION

The novel process of this invention lies in the discovery that a massive ilmenite ore can be processed to produce a satisfactory chlorination feed material provided the upgraded ore is given a roasting treatment prior to reduction; and that the reduced or metallized ore be leached initially with a dilute mineral acid at a relatively low temperature and for a short period of time and thereafter at a relatively high temperature for an extended period of time. Using this novel combination of steps both the magnesium and iron values in metallized ores derived from upgraded massive ilmenites have been reduced to acceptable levels without loss of $TiO_2$.

The essential steps of the process of the present invention are as follows:

(1) The upgraded massive ilmenite ore is roasted prior to reduction to achieve a ratio of ferric to ferrous iron of at least 1.0:1.0 and permissibly as high as 20:1;

(2) The roasted upgraded ore is reduced by hydrogen at reduction temperatures low enough to preclude sintering or the formation of a dititanate phase and yet high enough to insure substantially complete reduction of the iron fraction to metallic iron at an economical rate of reaction;

(3) The metallized ore is upgraded to remove gangue material prior to leaching;

(4) The gangue-free metallized concentrate is leached with a dilute mineral acid initially at relatively low temperatures for a short period of time and then at higher temperatures for longer periods of time to dissolve the metallic iron and magnesium fractions and simultaneously generate $H_2$ gas which is recycled to reduce additional oxidized ore;

(5) The leached concentrate is then filtered and washed to remove the solubilized iron and magnesium after which the washed $TiO_2$ concentrate is heated to drive off water and any residual acid.

The $TiO_2$ concentrate produced by the process outlined above will comprise from about 95.0 to 96.0% $TiO_2$ with residual iron values no higher than 1.2% and residual magnesium values no higher than 1.0% by weight of $TiO_2$ and hence is an ideal chlorination feed material for the production of titanium tetrachloride.

DESCRIPTION OF PREFERRED EMBODIMENT

MacIntyre ilmenite is a massive ore, and hence, unlike natural rutile ore and similar beach sand ilmenites, MacIntyre ilmenite must be crushed and ground prior to treatment. In this connection a significant aspect of the present invention is the discovery that reduction with hydrogen gas at relatively low temperatures, followed by acid leaching, effects no significant change in the particle size of the ore and hence the ore, prior to treatment, may be crushed and ground to a particle size which is optimum for use as chlorination feed material. In commercial operations this is from −40 to +200 mesh by standard Tyler screen analysis.

The ground ore, either in its raw state or preferably upgraded by the removal of the gangue constituents, is oxidized by subjecting it to a roasting treatment wherein the ore is heated in air to a temperature of from 600 to 1000° C. for a period of from 1 to 2 hours whereby the iron values in the ore concentrate are oxidized sufficiently that the ratio of ferric to ferrous iron is raised to at least 1.0:1.0 or higher.

Reduction of the oxidized ore is then carried out in a fluidized bed type operation whereby the oxidized ore is reduced by hydrogen gas which has been dried so as not to have more than from 0.2% to 0.5% moisture by weight. The flow rate of the hydrogen gas may vary from 0.3 to 2.0 ft./sec. and the hydrogen is preferably heated to facilitate maintaining the fluidized ore within the desired temperature range. The temperatures used in reducing the oxidized ore will vary depending upon whether or not reduction is carried out at atmospheric or super-atmospheric pressures. For systems employing pressures of for example 110–400 p.s.i.g. the reduction temperature may lie within the range of from 600 to 750° C.; while reductions carried out at atmospheric pressure would employ somewhat higher temperatures, i.e., from 700–950° C. While the latter system can be used successfully in the manner hereinafter described to produce low cost chlorination feed materials comparable to natural rutile $TiO_2$ concentrates, the superatmospheric systems offer a higher rate of production and somewhat higher hydrogen efficiencies. After heating the oxidized ore in the presence of hydrogen in the manner described above, substantially all of the $TiO_2$ will be in the form of rutile and the iron fraction will be metallized iron. In this connection reduction is measured on the basis of $H_2O$ recovery and is usually regarded as complete when 95 percent or more of the oxygen associated with the iron fraction has been recovered as water in the off gases. It is noteworthy that the reduced or metallized ore so produced is characterized by a porous open-grain structure within which the metallic iron is easily accessible for acid leaching.

Following reduction of the ore, which is sometimes referred to in the art as metallized ore, it is upgraded by passing the ore through a magnetic separator which separates and removes residual gangue materials therefrom so as to yield the highest possible $TiO_2$ concentrate after leaching.

Following magnetic separation the upgraded metallized ore, sometimes referred to hereinafter as a magnetic concentrate, is leached with a dilute mineral acid. Suitable dilute mineral acids are 5%–10% hydrochloric acid or waste sulfuric acid the latter being produced in the well known sulfate-process for producing $TiO_2$ hydrate by digesting titaniferous iron ores in concentrated sulfuric acid. Waste sulfuric acid is thus relatively inexpensive and wholly satisfactory since its acid concentration may vary from as low as 5% to as high as 25% $H_2SO_4$. In general the magnetic concentrate is leached with a dilute mineral acid such as HCl or waste sulfuric acid at an acid strength from 5 to 20%, at acid to ore ratios of 0.18:1 to 2.2:1 and at temperatures ranging from 20° C. to 100° C. for periods of time ranging from 30 minutes to 48 hours. More particularly leaching is done progressively i.e. the magnetic concentrate is leached initially with a dilute mineral acid at relatively low temperatures and for relatively short periods of time at acid ratios from 0.7:1 to 1.05:1 to solubilize the iron fraction, and thereafter leached at higher temperatures for longer periods of time at acid ratios from 0.18:1 to 2.2:1 to solubilize the magnesium fraction. Further, it has been observed that unconsumed leach acid may be recycled without significant reduction in leaching efficiencies.

The initial leaching step is carried out at temperatures in the range of from 20° C. to 60° C. for from 30 to 60 minutes at the end of which time substantially all of the iron fraction will be solubilized. During this period reaction of the dilute mineral acid with the metallized iron will produce hydrogen which will be generated at the rate of about 7.0 cubic feet of hydrogen, measured under standard conditions of 0° C. and 760 mm. mercury, per pound of metallic iron.

It will be appreciated that hydrogen is consumed during hydrogen reduction of the odixized ore. However, a major portion of the hydrogen consumed will be replenished by the hydrogen generated in leaching the magnetic concentrate. The amount of hydrogen generated in this manner bears a distinct relationship to the ratio of ferric to ferrous iron in the roasted ore. Thus in leaching a magnetic concentrate having a ferric to ferrous ratio of about 8:1 the hydrogen recovered will constitute about 70% of that used during reduction of the ore, exclusive of minor amounts of hydrogen consumed in the reduction of small amounts of impurity oxides in the ore. In this connection it has been found also that the hydrogen generated during leaching is extremely low in impurities and hence requires a minimum of treatment and handling before being recycled. From the foregoing it is evident that only a relatively small amount of make-up hydrogen is necessary to provide the total volume of hydrogen required for reducing additional magnetic concentrate, thereby effecting a significant economy in the reduction.

Following the initial leaching step the magnetic concentrate is subjected to additional leaching, again with a dilute mineral acid, but at higher temperatures and for longer periods of time. Typical temperatures employed during the second leaching step will range from 70° C. to 100° C. and leaching may be extended for 8 hours to as long as 48 hours to substantially completely solubilize the magnesium fraction.

Progressive leaching of the magnetic concentrate may be carried out in one operation or may be done in two separate steps; and as a practical matter it is preferred to carry out the second and longer leach in a separate leaching tank so as to minimize the capital investment in leaching equipment designed especially for recovery of gaseous hydrogen during the initial leaching of additional magnetic concentrate. In either case following progressive leaching the solubilized iron and magnesium fractions are separated and removed from the residual $TiO_2$ concentrate by washing and filtering after which the $TiO_2$ concentrate is dried and/or heated to volatilize off any residual acid.

By following the above described progressive leaching procedure it is now possible to remove both the iron and magnesium fractions from a metallized ore of the MacIntyre type without loss of $TiO_2$ and to product $TiO_2$ concentrates having at least 95.0% $TiO_2$ and as low as 0.4% Fe and 0.2% MgO; and while the process of this invention is particularly adapted to the treatment of massive ores of the MacIntyre type it will be understood that other types of ilmenites such as for example the Quilon ores from India and the ilmenite beach sands of Florida and Australia may be similarly processed to produce chlorination feed materials low in iron and magnesium values.

In order to illustrate the invention further examples are given describing the preoxidation of a massive ilmenite ore followed by hydrogen reduction, magnetic separation, and progressive leaching with a dilute mineral acid to recover a $TiO_2$ concentrate suitable for use as chlorination feed material.

Example I

A MacIntyre magnetic concentrate derived from a MacIntyre ilmenite ore which had been processed through a Wetherill magnetic separator to remove gangue materials was ground and screened to a particle size of about −48, +200 mesh by Tyler screen measurement. The elmenite concentrate analyzed 45.6% $TiO_2$, 4.3% $Fe_2O_3$, 40.4% FeO and 2.5% MgO. 2100 grams of this concentrate were oxidized by heating in air to a temperature of about 900° C. for 1 hour. The oxidation effected substantially no change in the particle size of the concentrate but the ratio of ferric to ferrous iron was raised from 0.1:1 to 12:1.

500 grams of this oxidized concentrate were then heated in a fluidized bed reactor to a temperature of 750° C. for 5 hours, and at a pressure of 3 inches mercury while 120 std. cu. ft. of dry hydrogen gas were passed through the ore bed at a space velocity of 1.3 ft./sec. At the end of the reduction period the reduced or metallized concentrate analyzed substantially 96.5% of the iron fraction as metallic iron. The metallized concentrate also exhibited an open highly porous grain structure with the metallic iron in the form of discrete particles less than 1.0 micron in diameter.

After cooling the metallized concentrate, any residual gangue materials were removed by passing the metallized concentrate through a magnetic separator. 70 grams of the resulting magnetic concentrate were then leached, initially in an aqueous solution of waste sulfuric acid at 10% acid strength in the ratio of 1.05 parts $H_2SO_4$ to 1 part by weight magnetic concentrate, leaching being carried out at a temperature of 65° C. for 60 minutes. During initial leaching hydrogen was evolved which constituted about 64% of that consumed during the reduction step. Following the initial leaching, a second leach was carried out at an elevated temperature, i.e., about 95° C. for 8 hours with waste acid at 21% $H_2SO_4$ strength in the ratio of 0.30 part $H_2SO_4$ to 1 part by weight of initially leached concentrate. The leached slurry was then cooled, washed and filtered to separate out the soluble iron and magnesium sulfates from the remaining $TiO_2$ concentrate which was then dried at 100° C. to remove any residual acid. The loss of $TiO_2$ by solution in the second leach liquor was only 0.1 percent of the $TiO_2$ in the initially leached concentrate. The dried $TiO_2$ concentrate analyzed 95.3% $TiO_2$, 0.4% Fe (total) and 0.2% MgO. The particle size of the leached ore was still essentially the same as it was before leaching (−48, +200 mesh).

Process controls and data relating to Example I and succeeding examples are shown in the table below.

Example II

A second run was made similar to Example I except the ilmenite concentrate was not given a preliminary roasting to oxidize the iron values prior to reduction, the ratio of ferric to ferrous iron being about 0.09:1. After reduction and magnetic separation the magnetic concentrate was progressively leached using the technique described in Example I above. The resulting $TiO_2$ concentrate analyzed 59.7% $TiO_2$, 27.2% Fe (total) and 3.1% MgO. The amount of iron and magnesium retained in the concentrate was so high as to prohibit the use of the concentrate as chlorination feed material.

Example III

A third run was made in all respects identical to that of Example I except that the magnetic concentrate was given an initial leach only with $H_2SO_4$ of 10% acid strength. The leached slurry was washed and filtered to separate the dissolved iron values and the resulting $TiO_2$ concentrate dried to volatilize any residual acid. The $TiO_2$ concentrate analyzed 90.8% $TiO_2$, 1.4% Fe (total) and 3.0% MgO. It will be seen that the $TiO_2$ concentrate had a prohibitively high amount of MgO.

Examples IV–V

Additional runs were made again each substantially identical to Example I except that the temperature and time used during progressive leaching of the magnetic concentrate were varied. In Example V the initial leaching temperature was relatively high, i.e., 90° C. and the initial leaching period relatively long. In each example however a $TiO_2$ concentrate was produced which was high in $TiO_2$ and sufficiently low in iron and magnesium values to be acceptable chlorination feed.

Examples VI–VII

Additional runs were made like Example I, but in Example VI the magnetic concentrate was progressively leached with hydrochloric acid at 5.0% acid strength, the initial leaching temperature 65° C. and the leaching time 60 minutes; while the second leaching temperature was 95° C. and the leaching time 8 hrs. Example VII illustrates a run made under conditions similar to those of Example VI except HCl of 37% acid strength was used and the second leaching time was only 4 hours. Again the final product was an excellent chlorination feed material.

Example VIII

Another run was made substantially identical to that of Example I except that the second leach was done with $H_2SO_4$ at 95.0% acid strength. It will be seen from the table that while the final product was comparable to the concentrates prepared by the methods of Examples IV and V the loss of $TiO_2$ by solution in the second leach liquor was as high as 6.3%.

TABLE.—PREPARATION OF CHLORINATION FEED MATERIAL FROM MASSIVE ILMENITE ORES

| Example No. | I | II | III | IV |
|---|---|---|---|---|
| Oxidation: | | | | |
| Ore¹ size, (mesh) | −48 +200 | −48 +200 | −48 +200 | −48 +200 |
| Ore charge (g.) | 2,100 | | 2,100 | 2,100 |
| Temp., °C | 900 | | 900 | 900 |
| Time, hrs | 1 | | 1 | 1 |
| Cu. ft. air STP/lb. ore | 10 | | 10 | 10 |
| Reduction: | | | | |
| Ore charge, (g.) | 500 | 250 | 500 | 500 |
| Temp., °C | 750 | 760 | 750 | 750 |
| Time, hrs | 4 | 7 | 4 | 4 |
| Press. (in. Hg) | 3 | 3 | 3 | 3 |
| Total H₂(s.c.f.) | 120 | 210 | 120 | 120 |
| Space velocity (ft./sec.) | 1.3 | 1.3 | 1.3 | 1.3 |
| Percent Fe metallized | 96.5 | 20.0 | 96.5 | 96.5 |
| Magn. concentrate: | | | | |
| Fe (M), percent | 38.9 | 7.4 | 38.9 | 38.9 |
| Fe(t), percent | 40.4 | 37.1 | 40.4 | 40.4 |
| Metn., percent | 96.5 | 20.0 | 96.5 | 96.5 |
| Acid leach, initial: | | | | |
| Acid strength (percent) | 10 | 10 | 10 | 5 |
| Acid:ore (wt. ratio) | 1.05:1 | 1.05:1 | 1.05:1 | 1.05:1 |
| Temp., °C | 65 | 65 | 65 | 40 |
| Time (min.) | 60 | 60 | 60 | 60 |
| Acid leach, second: | | | | |
| Acid strength (strength) | 21 | 21 | | 5 |
| Acid:ore (wt. ratio) | 0.3:1 | 0.3:1 | | 0.25:1 |
| Temp., °C | 95 | 95 | No | 95 |
| Time, hrs | 8 | 8 | (²) | 8 |

| Example No | I | II | III | IV |
|---|---|---|---|---|
| Loss of TiO$_2$ (percent) | 0.1 | 0.1 | | 0.06 |
| Leached concentrate: | | | | |
| Fe (t), percent | 0.4 | 27.2 | 1.4 | 0.6 |
| TiO$_2$, percent | 95.3 | 59.7 | 90.8 | 95.3 |
| MgO, percent | 0.2 | 3.1 | 3.0 | 1.0 |

| Example No | V | VI | VII | VIII |
|---|---|---|---|---|
| Oxidation: | | | | |
| Ore [1] size (mesh) | −48 +200 | −48 +200 | −48 +200 | −48 +200 |
| Ore charge (g.) | 2,100 | 2,100 | 2,100 | 2,100 |
| Temp., °C | 900 | 900 | 900 | 900 |
| Time, hrs | 1 | 1 | 1 | 1 |
| Cu. ft. air STP/lb. ore | 10 | 10 | 10 | 10 |
| Reduction: | | | | |
| Ore charge (gms.) | 500 | 500 | 500 | 500 |
| Temp., °C | 750 | 750 | 750 | 750 |
| Time, hrs | 4 | 4 | 4 | 4 |
| Press. (in. Hg) | 3 | 3 | 3 | 3 |
| Total H$_2$ (s.c.f.) | 120 | 120 | 120 | 120 |
| Space velocity (ft. sec.) | 1.3 | 1.3 | 1.3 | 1.3 |
| Percent Fe metallized | 96.5 | 96.5 | 96.5 | 96.5 |
| Magnetic concentrate: | | | | |
| Fe (M), percent | 38.9 | 38.9 | 38.9 | 38.9 |
| Fe (t), percent | 40.4 | 40.4 | 40.4 | 40.4 |
| Metn., percent | 96.5 | 96.5 | 96.5 | 96.5 |
| Acid leach, initial: | | | | |
| Acid strength (percent) | 17 | 10 | 10 | 10 |
| Acid:ore (wt. ratio) | 1.05:1 | 1.05:1 | 1.05:1 | 1.05:1 |
| Temp., °C | 90 | 65 | 65 | 65 |
| Time, min | 120 | 60 | 60 | 60 |
| Acid leach, second:[2] | | | | |
| Acid strength (percent) | 25 | 5% HCl | 37% HCl | 95% H$_2$SO$_4$ |
| Acid:ore (wt. ratio) | 0.18:1 | 0.25:1 | 2.2:1 | 2.0:1 |
| Temp., °C | 95 | 95 | 90 | 95+ |
| Time (hrs.) | 8 | 8 | 5 | 1.5 |
| Loss of TiO$_2$ (percent) | 0.15 | 0.07 | 1.8 | 6.3 |
| Leached concentrate: | | | | |
| Fe (t), percent | 1.0 | 0.7 | 0.9 | 1.2 |
| TiO$_2$, percent | 94.7 | 95.5 | 95.9 | 95.9 |
| MgO, percent | 1.0 | 1.0 | 0.2 | 0.65 |

[1] MacIntyre Wetherill ilmenite concentrate.
[2] Subsequent leach.

From the foregoing examples and by reference to the table above it will be evident that massive ilmenite ores of the MacIntyre type may be used as source material for the production of chlorination feed material economically and on a commercial scale provided however the massive ore concentrate is given an oxidation roast prior to reduction and that following reduction of the iron values to metallic iron the metallized ore is subjected to progressive leaching using a dilute mineral acid to dissolve both the iron and magnesium values without dissolution of TiO$_2$. Using the novel combination of steps that characterize the present invention massive ilmenite ores have been converted economically and on a commercial scale to TiO$_2$ concentrates that compare favorably in compositions with concentrates derived from natural rutile ores.

While this invention has been described and illustrated by the examples shown, it is not intended to be strictly limited thereto, and other variations and modifications may be employed within the scope of the following claims.

We claim:

1. Method for processing a MacIntyre ilmenite ore containing iron oxides and as high as 2.6% magnesium oxide as chlorinatable constituents to produce a TiO$_2$ concentrate comprising at least 95% TiO$_2$, less than 1.5% iron and no more than 1.0% MgO for use as chlorination feed material in the production of TiCl$_4$ comprising the steps of: grinding said MacIntyre ilmenite ore to a particle size within the range of from −40 to +200 mesh, upgrading the ground ore by removing the gangue therefrom, oxidizing the iron fraction in the upgraded ore by roasting said ore in the presence of air at a temperature and for a period of time sufficient to achieve a ratio of ferric to ferrous iron in said ore at least 1:1, reducing said oxidized ore by contact with gaseous hydrogen at a temperature sufficiently high to metallize the iron fraction in said ore, upgrading the metallized ore by removal of gangue constituents, leaching the upgrade metallized ore progressively with a dilute mineral acid having an acid concentration from 5.0 to 25% acid, at acid to ore ratios in the range of from 0.18:1 to 2.2:1 and wherein the initial leaching stage is carried out at relatively low temperatures and for relatively short periods of time to dissolve the metallized iron fraction and the subsequent leaching stage is carried out at higher temperatures and for relatively long periods of time to dissolve the magnesium oxide substantially without loss of TiO$_2$ and simultaneously generate at least 70% of the hydrogen gas required for reducing additional ore, filtering and washing the leached ore to separate and remove the solubilized iron, and magnesium oxide and recycling the generated hydrogen to reduce additional ore.

2. Method for processing a MacIntyre ilmenite ore according to claim 1 wherein the initial leaching is carried out with acid to ore ratios in the range of from 0.7:1 to 1.05:1 at a temperature from 20° C. to 60° C. for from 30 to 60 minutes and the subsequent leaching is carried out with acid to ore ratios in the range of from 0.18:1 to 2.2:1 at a temperature from 70° to 100° C. for from 8 to 48 hours.

3. Method for processing a MacIntyre ilmenite ore according to claim 2 wherein the dilute mineral acid is 5% to 25% waste sulfuric acid.

4. Method for processing a MacIntyre ilmenite ore according to claim 2 wherein the dilute mineral acid is 5% to 10% HCl.

References Cited

UNITED STATES PATENTS

| | | | |
|---|---|---|---|
| 1,256,368 | 12/1918 | Raffin | 23—202 |
| 2,631,941 | 3/1953 | Cole. | |
| 2,804,375 | 8/1957 | Kamlet | 23—202 |
| 2,914,381 | 11/1959 | Wainer | 23—202 |
| 3,060,002 | 10/1962 | Leddy et al. | 23—202 |
| 3,112,178 | 11/1963 | Judd | 23—202 |
| 3,149,963 | 9/1964 | Evans et al. | 75—101 |
| 3,193,376 | 7/1965 | Lo et al. | 23—202 XR |
| 3,291,599 | 12/1966 | Reeves | 23—202 XR |
| 3,383,200 | 5/1968 | Volk | 75—1 XR |

OTHER REFERENCES

Article by L. E. Lynd et al.: "Characteristics of Titaniferous Concentrates," August 1954, Mining Engineering, pages 817–824, volume 6, American Institute of Mining and Metallurgical Engineers, Inc., New York, N.Y.

McPherson and Henderson book, "A Course in General Chemistry," third edition (1927), pages 118 and 119, Ginn & Co., New York.

EDWARD STERN, Primary Examiner

U.S. Cl. X.R.

23—87, 201, 212; 75—1, 101